United States Patent
Zanzig et al.

(10) Patent No.: US 6,812,277 B2
(45) Date of Patent: Nov. 2, 2004

(54) TIRE WITH COMPONENT COMPRISED OF A BLEND OF POLYBUTADIENE-RICH RUBBER COMPOSITION WHICH CONTAINS A MINOR PORTION OF STYRENE-RICH STYRENE/ISOPRENE ELASTOMER

(75) Inventors: David John Zanzig, Uniontown, OH (US); Adel Farhan Halasa, Bath, OH (US); Chad Aaron Jasiunas, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 331 days.

(21) Appl. No.: 10/000,730

(22) Filed: Oct. 31, 2001

(65) Prior Publication Data

US 2003/0100660 A1 May 29, 2003

(51) Int. Cl.$^7$ .................................. C08L 9/06
(52) U.S. Cl. ................... 524/496; 524/493; 524/575; 525/332.4; 525/332.6; 525/332.5; 525/332.9; 525/333.1; 525/333.3
(58) Field of Search ................. 524/495, 496, 524/493; 525/314, 271, 332.4, 332.6, 332.5, 332.9, 333.1, 333.3

(56) References Cited

U.S. PATENT DOCUMENTS 3,856,764 A * 12/1974 Throckmorton et al. .... 526/137
5,470,929 A * 11/1995 Zanzig et al. ............... 526/181
6,313,216 B1 * 11/2001 Christian et al. ........... 524/575

FOREIGN PATENT DOCUMENTS

| EP | 587354 | 3/1994 | ............ C08L/9/00 |
| EP | 709235 | 5/1996 | ............ B60C/1/00 |
| EP | 899297 | 3/1999 | ............ C08L/21/00 |
| FR | 2797637 | 2/2001 | ............ C08L/9/00 |

OTHER PUBLICATIONS

European Search Report.

* cited by examiner

Primary Examiner—Katarzyna Wyrozebski
(74) Attorney, Agent, or Firm—Henry C. Young, Jr.

(57) ABSTRACT

Pneumatic rubber tire having at least one component or a rubber composition comprised of a major portion of relatively low Tg high cis 1,4-polybutadiene elastomer (BR) and a minor portion of a relatively high Tg, styrene-rich, styrene/isoprene elastomer (SIR) wherein the Tg of said BR is at least 60° C. lower than the Tg of said SIR. Said SIR has a styrene content of at least 30 weight percent. The styrene based units of said SIR are present substantially without large blocks of styrene units. Said BR is a high cis 1,4-polybutadiene having a cis 1,4-content of at least 96 percent and preferably has a branched macrostructure. In one aspect of the invention, said tire component is a tire tread, particularly a circumferential tire tread.

16 Claims, 2 Drawing Sheets

Figure 1:
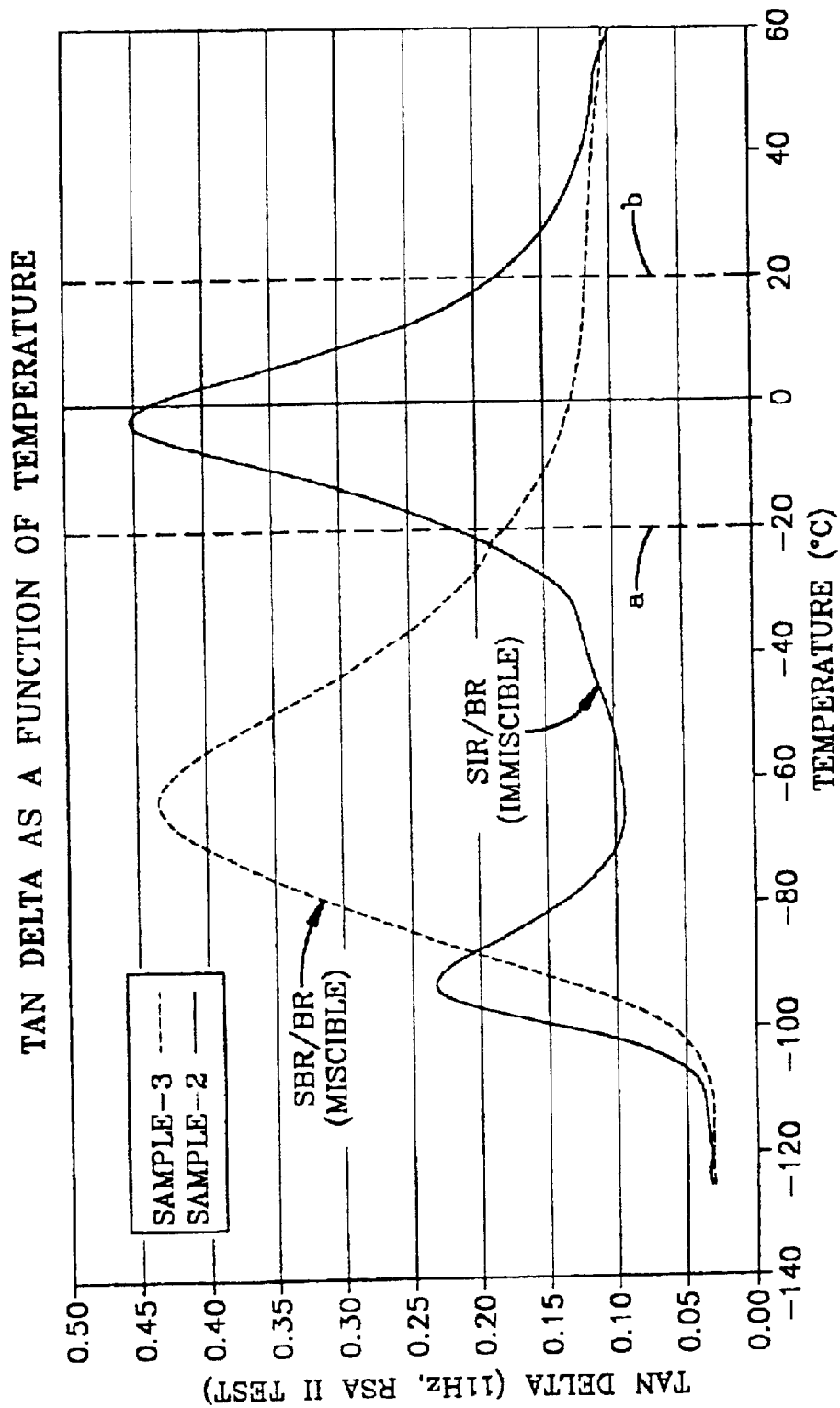

TIRE WITH COMPONENT COMPRISED OF A BLEND OF POLYBUTADIENE-RICH RUBBER COMPOSITION WHICH CONTAINS A MINOR PORTION OF STYRENE-RICH STYRENE/ISOPRENE ELASTOMER

FIELD OF THE INVENTION

Pneumatic rubber tire having at least one component or a rubber composition comprised of a major portion of relatively low Tg high cis 1,4-polybutadiene elastomer (BR) and a minor portion of a relatively high Tg, styrene-rich, styrene/isoprene elastomer (SIR) wherein the Tg of said BR is at least 60° C. lower than the Tg of said SIR. Said SIR has a styrene content of at least 30 weight percent. The styrene based units of said SIR are present substantially without large blocks of styrene units. Said BR is a high cis 1,4-polybutadiene having a cis 1,4-content of at least 96 percent and preferably has a branched macrostructure. In one aspect of the invention, said tire component is a tire tread, particularly a circumferential tire tread.

BACKGROUND OF THE INVENTION

Pneumatic rubber tires are often prepared with a component of a rubber composition which is composed of a blend of elastomers.

For example, a rubber tread component is typically comprised of a blend of elastomers to promote desirable tire tread properties such as, for example, traction, reduction in tread wear and reduced rolling resistance.

Historically, passenger tire treads are commonly composed of rubber blends of a styrene/butadiene copolymer elastomer (SBR), which is usually used to promote traction characteristics for the tire tread, and cis 1,4-polybutadiene rubber which is usually used to promote reduction in tread wear and reduction in rolling resistance for the tire tread.

Such rubber blends are typically SBR-rich in that the SBR is conventionally used as the major elastomer component of the tread rubber composition because tread traction on the road surface is usually a significantly desirable feature for the tire and, also, the SBR in its uncured state is relatively easy to process. Contrarily, the cis 1,4-polybutadiene rubber is conventionally a minor component of the rubber composition because, in its uncured state, it is typically of a relatively high viscosity (high Mooney viscosity) and therefore more difficult to process in rubber processing equipment.

Such SBR-rich tire tread rubber compositions may also sometimes contain minor amounts of one or more other elastomers, in addition to said minor amount of cis 1,4-polybutadiene rubber, such as, for example, cis, 1,4-polyisoprene rubber (particularly natural rubber), isoprene/butadiene copolymer rubber and/or 3,4-polyisoprene rubber, and perhaps trans 1,4-butadiene.

For a tire, it is often desired to optimize one or more of a tire's treadwear, skid resistance, and rolling resistance by choice of a tire tread's rubber composition.

However, as it is known to those having skill in such art, an optimization in one of such tire properties by varying the tire tread rubber composition usually diminishes one or more of the other two properties.

Achieving an optimization of all of treadwear, wet skid resistance and rolling resistance by the rubber composition for the tire tread is therefore a challenge.

Accordingly, for high performance tires, an increase in the rate of wear of the tread might be acceptable where very good wet and dry traction of a tire tread is desired. Thus, rubber compositions intended to emphasize very good wet and dry traction for a tire tread may, however, often exhibit a relatively lower resistance to abrasion, higher rolling resistance and lower snow traction and higher brittle point. These formulations usually contain a higher concentration of SBR as a major component of rubber compositions for such tire treads.

A traction promoting elastomer, such as for example styrene/butadiene elastomer, might be used for tread rubber compositions may typically exhibit a relatively high Tg above −50° C. such as, for example, Tg within a range of about zero down to about −50° C.

However, high Tg polymers typically raise the brittle point of the rubber compositions and such rubber compositions are therefore more susceptible to cracking at cold temperatures. For example, rubber compositions for treads for all-season tires may desirably have a brittle point below −40° C.

In contrast to such high Tg styrene/butadiene rubber, an elastomer such as, for example cis 1,4-polybutadiene, used in a tread rubber composition, in combination with such styrene/butadiene rubber, to promote good (relatively low) treadwear might have a much lower Tg, for example, a Tg lower than −90° C.

In such rubber composition, the low Tg cis 1,4-polybutadiene rubber is usually used to promote tread wear for a tire tread. However the amount of cis 1,4-polybutadiene is usually limited to a relatively minor component of the elastomers for a tire tread (e.g. usually less than 35 weight percent thereof) because if the cis 1,4-polybutadiene elastomer is present as a major component (e.g. greater than 50 weight percent), the resulting rubber composition typically exhibits a relatively high and, generally unacceptable, mixing and processing viscosity (e.g. a high Mooney ML 1+4 viscosity) without blending a rubber processing oil with the cis 1,4-polybutadiene to reduce its processing viscosity. In addition, levels of cis 1,4-polybutadiene greater than 35 weight percent in treads usually result in unacceptable wet traction.

In such rubber composition, the styrene/butadiene rubber is usually used to promote traction for a tire tread and is typically present as a major component of the elastomers (e.g. greater than 50 weight percent). The styrene content of the styrene/butadiene rubber in commercial tire treads is conventionally in a range of about 10 to about 40 weight percent of the elastomer.

Styrene/butadiene rubber and cis 1,4-polybutadiene rubber are typically compatible and therefore a plot of Tan delta versus temperature for a blend of such elastomers may exhibit one only maximum peak. Therefore, for rubber compositions based upon such on such compatible rubber blends, low temperature physical properties are typically sacrificed for high temperature physical properties of the rubber composition. For example, a tire treadwear property may be typically compromised with an increase in wet traction property when such compatible rubber blend is used for a tire tread rubber composition. Furthermore, the cold brittle point temperature of the tire tread rubber composition may typically be raised with an increase in wet traction when a compatible blend of such elastomers is used for the tire tread rubber composition to render the tire tread less useful at very low operating temperatures.

For a description of this invention, terms such as "compounded rubber", "rubber compound" and "compound", if used herein, refer to rubber compositions composed of one or more elastomers blended with various ingredients, including curatives such as sulfur and cure accelerators. The terms "elastomer" and "rubber" might be used herein interchangeably. It is believed that all of such terms are well known to those having skill in such art.

A reference to glass transition temperature, or Tg, of an elastomer or elastomer composition, if referred to herein, represents the glass transition temperature(s) of the respective elastomer or elastomer composition in its uncured state or possibly a cured state in a case of an elastomer composition. A Tg can be suitably determined by a differential scanning calorimeter (DSC) at a temperature rate of increase of 10° C. per minute. (ASTM 3418).

A reference to a rubber composition's brittle point relates to a cold temperature property value according to ASTM D746 for the rubber composition and is a measure of a temperature when a rubber composition becomes brittle and therefore a measure of the usefulness of the rubber composition at very cold temperatures

DISCLOSURE AND PRACTICE OF THE INVENTION

In accordance with this invention, a pneumatic rubber tire is provided having a tire tread, (circumferential rubber tread) where said tread is a rubber composition comprised of, based on parts by weight per 100 parts by weight of the tread rubber elastomers (phr), (A) elastomers comprised of
  (1) about 5 to about 45, alternatively about 10 to about 40, phr of styrene/isoprene copolymer elastomer (SIR) having a styrene content in a range of from 30 to about 55, alternatively from 30 to about 50, percent, a single Tg within in a range of about 0° C. to about −40° C., alternately in a range of from about −5° C. to about −30° C., and wherein the isoprene component of said SIR has a microstructure comprised of a maximum 3,4-polyisoprene content of 11 percent, and
  wherein the styrene distribution in said SIR is characterized in that,
    (a) the minimum percent of the styrene units present in not more than five sequential styrene units ($St_5$) is equal to about the sum of 125.6 minus 0.92 times the percent by weight of styrene units in the SIR, and
    (b) the maximum percent of styrene units present in more than five sequential styrene units is equal to 100 less the said minimum $St_5$ unit percent, and
  (2) about 55 to about 95, alternatively about 60 to about 90, phr of cis 1,4-polybutadiene rubber (BR) having a cis 1,4-content of at least 95 percent and a single Tg within in a range of from about −100° C. to about −107° C.,
  wherein the weight ratio of said BR to said SIR is at least 1.1/1 and alternately in a range of from about 60/40 to about 80/20,
  wherein the Tg of said BR is at least 60° C., and preferably at least 85° C., lower than the Tg of said SIR and optionally, at least 95° C. lower than the Tg of said SIR;

(B) about 40 to about 110, alternatively about 50 to about 90, phr of reinforcing filler comprised of at least one of carbon black, aggregates of precipitated silica and silica-containing carbon black which contains silica domains on its surface;

(C) a coupling agent, when said reinforcing filler is precipitated silica and/or said silica-containing carbon black, having a moiety reactive with hydroxyl groups contained on the surface of said aggregates of precipitated silica and hydroxyl groups contained on the surface of the silica domains of said silica-containing carbon black.

In practice, said BR may be a specialized BR as a cis 1,4-polybutadiene elastomer having a cis 1,4-content in a range of about 96 to about 98 percent, and prepared by polymerizing 1,3-butadiene in the presence of organonickel compound as a nickel salt of a carboxylic acid, organoaluminum compound as a trialkylaluminum compound, hydrogen fluoride and para-styrenated diphenylamine, wherein said organoaluminum compound and said fluorine containing compound are brought together in the presence of said para-styrenated diphenylamine. Such specialized BR may have a Mooney, (ML 1+4) at 100° C., viscosity value in its unvulcanized state in a range of about 35 to about 45 and a cold flow value of less than 1.2 mg/minute. Such specialized BR may also be referred to herein as a Branched BR as it is considered herein as containing a degree of branching. For the purposes of describing this invention, the term "BR" is usually intended to include the specialized BR, or branched BR, unless otherwise indicated.

In the further practice of the invention, said rubber composition may also contain from zero to about 20, alternatively about 10 to about 20 phr of at least one elastomer, other than said SIR and BR elastomers, selected from polymers of isoprene and/or 1,3-butadiene and copolymers of styrene with 1,3-butadiene and copolymers (terpolymers) of styrene, 1,3-butadene and isoprene.

A significant aspect of this invention is the use of a high styrene-containing styrene/butadiene elastomer (SIR) in combination with a BR, and particularly including said specialized BR, in which the BR is in the majority and therefore considered herein as being the continuous phase insofar as the said SIR and said BR elastomers are concerned as well as a requirement that said elastomers individually have single Tg's within the prescribed temperature ranges and the Tg of said BR is at least 60° C., preferably at least 85° C., lower than said Tg of said SIR.

For a more detailed preparation of said specialized BR, considered herein to be a branched and more easily processible BR, U.S. Pat. No. 5,451,646 is hereby incorporated by reference in its entirety.

In general, said specialized BR may be characterized by having a cis 1,4-content of at least 96 percent, a Tg in a range of about 100° C. to about 107° C., a Mooney (ML 1+4) at 100° C. viscosity value in a range of from about 30 to about 40 and preferably a melting point (ASTM D3418) in a range of about −4° C. to about −6° C.

The high styrene containing styrene/isoprene elastomer which contains a substantially random styrene distribution (SIR) may be prepared, for example, by the procedure described in Example I herein.

It is to be appreciated that said SIR elastomer contains its units derived from styrene in a substantially random distribution in said copolymer as presented by the aforesaid styrene distribution characterization in which a major portion of the styrene units are present in a sequence of 5 or less sequential units and only a minor portion are present in greater than 5 sequential units.

The difference in spatially defined Tg's of the SIR and the BR elastomers of at least 60° C., preferably at least 85° C., is also considered to be an important aspect of the invention, in order to provide a good balance of both relatively good abrasion resistance indicative of tire treadwear for a tire tread of such rubber composition and relatively high hysteresis at low temperatures in a range of −20° C. to +10° C. (or even up to +20° C.) as an indication of good wet traction of a tire tread of such rubber composition.

In this manner, it is considered herein that the relatively low Tg BR elastomer is relatively immiscible with the higher Tg SIR elastomer so that such elastomers are of two phases. By using BR in the majority, the BR phase is considered herein as being the continuous phase and the SIR being of a discontinuous phase, insofar as said two elastomers are concerned.

In the practice of the invention, it is important that the BR, and particularly the specialized, improved processing, cis 1,4-polybutadiene rubber (sometimes referred to herein as a specialized BR) is used in the majority and therefore is the continuous phase of the blend of the relatively immiscible BR and SIR elastomers. The use of the specialized, improved processing BR is considered herein to aid in the processing of the rubber composition which contains the specialized BR. By having the BR as the continuous phase, it is considered herein that reduction in tire treadwear and brittle point of the rubber composition are optimized. That is, treadwear and brittle point are controlled and dominated by the continuous phase, which for this invention, is the BR which is considered herein to be the desirable elastomer for tire treadwear and rubber composition brittle point considerations.

In practice, the relatively high styrene-containing styrene/isoprene copolymer elastomer (SIR), while used in the minority as compared to the BR elastomer, it is considered herein to be important to promote tire tread traction, hysteresis, or coefficient of friction, for the rubber composition. It is desired herein that the relatively high styrene content of the SIR elastomer be at least 30 percent to aid in promoting tire tread traction enhancement. By having the SIR as the minor, dispersed phase, it is considered herein that the rubber composition's hysteresis and wet traction properties can be enhanced without adversely affecting the treadwear and brittle point properties.

Use of the specialized high cis 1,4-polybutadiene rubber (BR) is considered herein to be important in order to promote a good balance of abrasion resistance and hysteresis for the rubber composition and to aid in the processability of the rubber composition and, further, it allows for a use of a greater amount of a polybutadiene rubber in the rubber composition.

Use of a minor amount of cis 1,4-polyisoprene, preferably natural rubber in the rubber composition, is considered herein to be normally useful to enhance uncured rubber composition processability with minimum processing oil and processing additives which are considered herein to adversely offset abrasion resistance.

The addition of a small, minor amount of cis 1,4-polyisoprene natural rubber is also considered herein to be important to contribute to tear resistance property for the tread rubber composition.

Use of rubber reinforcing carbon black(s) and silica reinforcement fillers for this invention, is considered herein to be important in order to provide good abrasion resistance, or coefficient of friction and also enhanced, or relatively high hysteresis for relatively good traction for a tire tread.

Representative of such rubber reinforcing carbon blacks are, for example, N121 N205 and N299. Examples of reinforcing carbon blacks for elastomers, generally, together with their Iodine number values and DBP (dibutyl phthalate) absorption values, may be found in *The Vanderbilt Rubber Handbook,* (1990), 13th Edition, Pages 416 through 419.

As hereinbefore related, use of the combination of the aforesaid SIR (in the majority) and BR (in the minority) elastomer blend is considered herein to be important in order to optimize, for the tire tread, both abrasion resistance (to enhance treadwear) and hysteresis (to enhance traction).

Indeed, it is considered herein that the utilization of the selected and combined elastomers to provide an immiscible elastomer blend as defined by a sulfur cured elastomer composition having the two Tan delta peaks (in a plot of tan delta values versus temperature), is significant, is believed to be novel and is believed to be a departure from using typical blends of elastomers with one tan delta peak cured elastomer composition within a temperature range of about −90° C. to about 10° C., utilizing the defined elastomers having Tg's spaced apart by at least 60° C.

As hereinbefore discussed, in the further practice of this invention, while maintaining the aforesaid basic synthetic elastomer composition, it is envisioned herein that the tread rubber composition may contain a very minor amount of about 5 to about 15, or perhaps up to 20, phr of at least one additional diene based synthetic elastomer.

Such additional synthetic diene based elastomers can be, for example, cis 1,4-polyisoprene, high vinyl polybutadiene having a vinyl content of from 30 to about 90 percent, and 3,4 polyisoprene.

In practice, it is preferred that the elastomers utilized in the tread composition, including both the other and the additional elastomers, are exclusive of polymers and copolymers of isobutylene, including halogen modifications thereof.

As hereinbefore pointed out, the invention is based upon a novel combination of elastomers, namely said SIR (in the majority) and said BR (in the minority). This aspect of the invention is considered particularly important for creating a tire tread rubber composition with good abrasion properties coupled, also, with good traction, or coefficient of friction, or hysteresis, properties. This aspect of the invention is especially directed to its more narrowly defined aspects which is restated, in its narrower form.

While it is considered that a tire tread rubber is conventionally reinforced with a particulate carbon black reinforcing filler, it is recognized that, for some tire applications, aggregates of precipitated silica reinforcement may also be desired. In such case, about 5 to about 25 phr or, alternatively, from 25 to about 80 or from about 30 to about 80 phr of precipitated silica might be used wherein the overall total of carbon and precipitated silica is in a range of from 40 to about 110.

The commonly employed siliceous pigments used in rubber compounding applications are usually aggregates of precipitated siliceous pigments (referred to herein as silica).

The siliceous pigments employed may be precipitated silicas such as, for example, those obtained by the acidification of a soluble silicate, e.g., sodium silicate.

The BET surface area of the silica, as measured using nitrogen gas, may, for example, be in a range of about 50 to about 300, alternatively about 120 to about 200, square meters per gram. A BET method of measuring surface area is described in *The Journal of the American Chemical Society,* Volume 60, Page 304 (1930).

The silica may also have a dibutylphthalate (DBP) absorption value in a range of about 100 to about 400, and usually about 150 to about 300, $cm^3/100$ g. Various commercially available silicas may be considered for use in this invention such as, for example, only and without limitation, silicas commercially available from PPG Industries under the Hi-Sil trademark with designations 210, 243, etc; silicas available from Rhodia, with designations of Zeosil 1165MP, Zeosil 165GR and silicas available from Degussa AG with designations such as VN2, VN3, Ultrasil 3370 and Ultrasil 7005 and silicas from J. M. Huber as Zeopol 8745, Zeopol 8755 and Zeopol 8715.

Silica-containing carbon blacks which contain silica domains on their surface may be prepared, for example, by co-fuming carbon black and silica.

When silica reinforcement is used for a rubber tire tread, the silica is conventionally used with a coupling agent, or what is sometimes referred to as a reinforcing agent.

Compounds having a moiety capable of reacting with both hydroxyl groups contained on the silica surface (e.g. silanol groups) and another moiety interactive with the diene-based rubber elastomer molecule in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the hydroxyl groups contained on the silica surface and, also, a constituent component, or moiety, capable of interacting with the diene-based rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber such as, for example, silane coupling agents containing a polysulfide component, or structure, such as bis-(3-trialkoxysilylalkyl)polysulfide, such as for example, bis-(3-triethoxysilylpropyl)polysulfide, which contains an average of either 2 to 2.6 or from 3.5 to 4 connecting sulfur atoms in its polysulfidic bridge, preferably an average of from 2 to 2.6.

It is readily understood by those having skill in the art that the rubber compositions of the tread would be compounded with conventional compounding ingredients including the aforesaid reinforcing fillers such as carbon black, as hereinbefore defined, possibly an addition of a minor amount of precipitated silica, usually, in combination with a silica coupling agent, as well as antidegradant(s), processing oil as hereinbefore defined, stearic acid or a zinc stearate, zinc oxide, sulfur-contributing material(s) and vulcanization accelerator(s) as hereinbefore defined.

Such compounding of rubber is well known to those having skill in such art. Antidegradants are typically of the amine or phenolic type. While stearic acid is typically referred to as a rubber compounding ingredient, it may be pointed out that the ingredient itself is usually obtained and used as a mixture of organic acids primarily composed of stearic acid with at least one of oleic acid, linolenic acid and palmitolic and/or palmitic acid normally contained in the stearic acid as typically used. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, waxes such as microcrystalline and paraffinic waxes typically used in a range of about 1 to 5 phr and often in a range of about 1 to about 3 phr; and resins, usually as tackifiers, such as, for example, synthetic hydrocarbon and natural resins typically used in a range of about 1 to 5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to about 5 phr and usually in a range of about 0.5 to about 3 phr; and the accelerator(s), often of the sulfenamide type, is (are) used in a range of about 0.5 to about 3 phr and often in a range of about 1 to about 2 phr. However, the preferred cure system of sulfur and accelerators has already hereinbefore been defined.

The ingredients, including the elastomers but exclusive of sulfur and accelerator curatives, are normally first mixed together in a series of at least two sequential mixing stages, although sometimes one mixing stage might be used, to a temperature in a range of about 145° C. to about 180° C., and such mixing stages are typically referred to as non-productive mixing stages. Thereafter, the sulfur and accelerators, and possibly one or more retarders and one or more antidegradants, are mixed therewith to a temperature of about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art. In such case of retreading of a tire, the tire tread might first be precured and then applied to the already cured tire carcass with a curable gum strip between the tread and carcass and the assembly then submitted to curing conditions to cure the aforesaid gum strip.

The invention may be better understood by reference to the following example in which the parts and percentages are by weight unless otherwise indicated.

EXAMPLE I—SYNTHESIS OF SIR

A styrene-rich styrene/isoprene rubber (high styrene SIR) was prepared (synthesized) by the polymerization of styrene and isoprene monomers in the presence of catalyst composed of sodium dodecylbenzene sulfonate (SDBS) and n-butyllithium (BuLi) in a hexane solvent according to the following procedure.

In a suitable glass reactor equipped with a mechanical stirrer and temperature control via cooling water and low pressure steam was charged with 900 grams of a solution composed of 180 grams of styrene and 720 grams of hexane solvent and 1100 grams of a solution composed of 220 grams of isoprene and 880 grams of hexane solvent. The mixture within the reactor was heated to a temperature of about 65° C. While stirring, 2.67 mmol of BuLi and 2 mmol of SDBS (catalyst components—a molar ratio of SDBS to BuLi of 0.75/1) were charged to the reactor to initiate the polymerization of the monomers. Samples were taken over the course of the reaction in order to determine monomer conversion as a function of time. The polymerization was short-stopped with denatured ethyl alcohol and an antioxidant was added to the resulting polymer. The polymer was then dried for several days in an oven (about 65° C.) to remove solvent by evaporation to yield a high styrene containing SIR which contained about 45 weight percent bound styrene.

Accordingly, it is considered herein that said SIR can be prepared by polymerizing styrene and isoprene monomers in an organic solvent (e.g. hexane) in the presence of an anionic polymerization catalyst, such as an organo lithium compound (e.g. n-butyllithium) and a sodium alkoxide or sodium sulfonate.

EXAMPLE II—SYNTHESIZED SIR's

Using the procedure of Example I, a series of high styrene SIR polymers was synthesized. While keeping the reaction conditions constant (temperature, time, etc), the styrene contend was varied from 30 to 60 percent of the polymer (elastomer). Thus a series of elastomers was prepared which exhibited a range of glass transition temperatures (Tg's) for evaluation.

The following Table 1 illustrates various properties of the elastomers. The Samples of elastomers are referred to as Samples A through E, with Sample A representing the Sample prepared according to Example I.

TABLE 1

| Sample | % Styrene | Tg (° C.) | % 3,4 PI | % 1,4 PI | Mn | PDI | Mooney |
|---|---|---|---|---|---|---|---|
| A | 44.8 | −18.2 | 10.3 | 40.9 | 390K | 1.12 | 90 |
| B | 9.1 | −56.6 | 9.2 | 81.7 | 446K | 1.14 | 75 |
| C | 19 | −48.1 | 8.3 | 72.7 | 393K | 1.25 | 79 |
| D | 27.4 | −38.7 | 8.6 | 64 | 408K | 1.22 | 80 |
| E | 34.6 | −32.9 | 9.6 | 55.8 | 428K | 1.18 | 88 |
| F | 40.1 | −27.1 | 9.9 | 50 | 435K | 1.17 | 87 |
| G | 49 | −16 | 8.3 | 42.7 | 493K | 1.2 | 90 |
| H | 57.2 | −3.2 | 7.7 | 35.1 | 500K | 1.15 | 86 |
| I | 67.1 | 21.1 | 5.8 | 27.1 | 562K | 1.17 | 77 |

All polymer characterizations were carried out using the standard methods. In Table 1, the Tg was determined through differential scanning calorimetry (DSC) techniques. The term "% 3,4" refers to the microstructure of the SIR in terms of percent 3,4-structure of the isoprene portion of the SIR. The term "% 1,4" refers to the microstructure of the SIR in terms of percent of 1,4-structure on the isoprene portion of the SIR. These were determined through nuclear magnetic resonance (NMR) techniques. The term "Mn" refers to the number average molecular weight of the SIR. The term "PDI" refers to polydispersity index which is a measure of the weight average molecular weight divided by the number average molecular weight and is indicative of linearity of the resulting polymer. The term "Mooney" relates to the Mooney (ML 1+4) viscosity of the elastomer taken at 100° C.

From Table 1 it can be seen that the glass transition temperature (Tg) of the polymer is controlled by the amount of styrene in the copolymer. Also, the amount of 3,4-polyisoprene is less than 11 percent is not dependent on the copolymer composition.

This is considered herein to be significant in that it shows that the styrene is randomly incorporated into the polymer chain. Also, the 3,4-polyisoprene represents only a small fraction of the total isoprene, therefore the resulting polymer should exhibit superior properties.

EXAMPLE III—SIR STYRENE SEQUENCES

Styrene sequence distribution of styrene units contained in Samples A through I were determined through ozonolysis techniques. Table 2 reports the styrene sequences.

TABLE 2

| | Styrene Distributions | | | | | | | | |
|---|---|---|---|---|---|---|---|---|---|
| Se- | Sample Identification | | | | | | | | |
| quence | A | B | C | D | E | F | G | H | I |
| 1S | 18.6 | 58.4 | 47.3 | 36.8 | 25.7 | 20.0 | 16.2 | 15.3 | 12.5 |
| 2S | 27.3 | 33.5 | 34.5 | 35 | 30.1 | 26 | 23.8 | 20.3 | 16.1 |
| 3S | 21.9 | 8.1 | 14.9 | 19.3 | 21.7 | 21 | 20.5 | 16.3 | 14 |
| 4S | 14.6 | 0 | 3.3 | 5.5 | 13.4 | 15 | 14.8 | 12.9 | 11.8 |
| 5S | 9.6 | 0 | 0 | 3.4 | 6.7 | 9.5 | 10.7 | 11.1 | 11.1 |
| 6S | 5.4 | 0 | 0 | 0 | 2.4 | 5.5 | 6.9 | 9.6 | 10.3 |
| 7S | 1.8 | 0 | 0 | 0 | 0 | 2.3 | 3.4 | 3.6 | 5.2 |
| 8S | 0.4 | 0 | 0 | 0 | 0 | 0.7 | 2.3 | 3.8 | 5.2 |
| 9S | 0.4 | 0 | 0 | 0 | 0 | 0 | 1 | 0.8 | 1.4 |
| 10S | 0 | 0 | 0 | 0 | 0 | 0 | 0.4 | 2.2 | 2.8 |
| 11S | 0 | 0 | 0 | 0 | 0 | 0 | 0 | 1.5 | 1.9 |
| 12S | 0 | 0 | 0 | 0 | 0 | 0 | 0 | 1 | 2.4 |
| 13S | 0 | 0 | 0 | 0 | 0 | 0 | 0 | 0.6 | 1.9 |
| 14S | 0 | 0 | 0 | 0 | 0 | 0 | 0 | 0.4 | 1.2 |
| 15S | 0 | 0 | 0 | 0 | 0 | 0 | 0 | 0.2 | 0.9 |
| 16S | 0 | 0 | 0 | 0 | 0 | 0 | 0 | 0.1 | 0.5 |
| 17S | 0 | 0 | 0 | 0 | 0 | 0 | 0 | 0.1 | 0.4 |
| 18S | 0 | 0 | 0 | 0 | 0 | 0 | 0 | 0.1 | 0.2 |
| 19S | 0 | 0 | 0 | 0 | 0 | 0 | 0 | 0.1 | 0.1 |
| 20S | 0 | 0 | 0 | 0 | 0 | 0 | 0 | 0 | 0.1 |
| 21S | 0 | 0 | 0 | 0 | 0 | 0 | 0 | 0 | 0.1 |
| Total | 100 | 100 | 100 | 100 | 100 | 100 | 100 | 100 | 100 |

From Table 2 it can be seen that for SIR under 35 percent styrene, a random copolymer, insofar as the styrene units are concerned, is produced. Even polymers containing up to 60 percent styrene are nearly random.

This is considered herein to be significant because random high styrene content, low 3,4-isoprene content, styrene/isoprene copolymers are not known to be reported in the literature.

Moreover, it can be seen that from the styrene sequences reported in Table 2, the following can be summarized in the following Table 3.

TABLE 3

Styrene Distributions

| Sample Identification | A | B | C | D | E | F | G | H | I |
|---|---|---|---|---|---|---|---|---|---|
| Styrene (%) | 44.8 | 9.1 | 19 | 27.4 | 34.6 | 40.1 | 49 | 57.2 | 67.1 |
| Summary of Styrene Unit Sequences | | | | | | | | | |
| 1S through 5 S | 92 | 100 | 100 | 100 | 97.6 | 91.5 | 86 | 75.9 | 65.5 |
| 6S through 8 S | 8 | 0 | 0 | 0 | 2.4 | 85 | 13.6 | 17.8 | 22.1 |
| 9S or greater S | 0 | 0 | 0 | 0 | 0 | 0 | 0.4 | 6.3 | 12.4 |
| Total | 100 | 100 | 100 | 100 | 100 | 100 | 100 | 100 | 100 |

From Table 3 it can be seen that for polymers containing up to 60 percent styrene, the majority of the styrene units are present as five styrene units or less. Only very small amounts of styrene units are present as 10 styrene units or greater, if any.

This is considered herein to be significant because such substantially random high styrene, styrene/isoprene copolymers being generated novel catalyst system for such copolymerization is considered herein to be novel and significantly inventive.

From Table 3 it is considered herein that it may reasonably be concluded that the SIR (styrene/isoprene elastomer) for this invention having a high styrene content in a range of from about 30 to about 55 weight percent, the minimum percent of the styrene units present in not more than five sequential styrene units ($St_5$) is equal to about the sum of 125.6 minus 0.92 times the percent by weight of styrene units in the SIR.

Accordingly, the maximum percent of styrene units present in such SIR in more than 5 sequential units is equal to 100 less than said minimum $St_5$ unit percent.

EXAMPLE IV

Mixtures of diene rubber compositions were prepared and referred to herein as Samples 1, 2 and 3, with Sample 1 being a Control Sample.

Control Sample 1 utilized a blend of styrene/butadiene rubber (SBR), cis 1,4-polyisoprene natural rubber and 3,4-polyisoprene rubber.

Sample 2 utilized a blend of high styrene styrene/isoprene rubber (high styrene SIR, namely Sample A of Example II) and specialized BR, namely a branched cis 1,4-polybutdiene rubber (referred to in this Example as "Branched BR").

Sample 3 utilized a blend of styrene/butadiene rubber (SBR) and Branched BR.

Conventional, preferred, amounts of antidegradant(s) (para-phenylene diamine type), tackifying resin, fatty acid, zinc oxide, rubber processing oil, and peptizer, were used.

The rubber blends are exemplified in the following Table 4.

TABLE 4

| Material | Control Sample 1 | Sample 2 | Sample 3 |
|---|---|---|---|
| Non-Productive Mix Stages | | | |
| Styrene/butadiene rubber[1] | 30 | 0 | 0 |
| Natural rubber[2] | 55 | 0 | 0 |
| 3,4-Polyisoprene rubber[3] | 15 | 0 | 0 |
| Styrene/isoprene rubber[4] | 0 | 30 | 0 |
| Styrene/butadiene rubber[5] | 0 | 0 | 30 |
| Cis 1,4-polybutadiene rubber[6] | 0 | 70 | 70 |
| Carbon black[7] | 38 | 38 | 38 |
| Silica[8] | 10 | 10 | 10 |
| Coupling agent[9] | 2 | 2 | 2 |
| Stearic acid | 2 | 2 | 2 |
| Antidegradants[10] | 3 | 3 | 3 |
| Processing aids[11] | 6 | 6 | 6 |
| Productive Mix Stage | | | |
| Sulfur | 1.5 | 1.5 | 1.5 |
| Zinc oxide | 2.5 | 2.5 | 2.5 |
| Accelerators[12] | 1.1 | 1.1 | 1.1 |

[1]An organic solvent solution polymerization prepared styrene/butadiene copolymer elastomer having a styrene content of about 12 percent and a Tg of about −42° C. obtained from The Goodyear Tire & Rubber Company
[2]Cis 1,4-polyisoprene natural rubber
[3]3,4-polyisoprene rubber obtained from The Goodyear Tire & Rubber Company
[4]High styrene styrene/isoprene rubber as represented by Sample A having a styrene content of about 45 weight percent and a Tg of about −16° C.
[5]Styrene/butadiene rubber having a styrene content of about 25 percent, a vinyl content of about 52 percent and a Tg of about −18° C. obtained as Solflex ® 2552 from The Goodyear Tire & Rubber Company
[6]Cis 1,4-polybutadiene elastomer (Branched BR) having a high cis 1,4-content of about 97 percent, and a Tg of about −104° C. prepared by polymerization of 1,3-butadiene according to the description thereof on Page 5 in this Specification, obtained as Budene ® 1280 from The Goodyear Tire & Rubber Company
[7]An N299 (ASTM designation) carbon black reportedly having an Iodine number of about 122 with a DBP value of about 115
[8]Silica as HiSil210 from PPG Industries
[9]Obtained as X50S from Degussa as a 50/50 composite of carbon black and bis-(3-triethoxysilylpropyl) tetrasulfide
[10]paraphenylene diamine
[11]Paraffinic oil, waxes and peptizer
[12]sulfenamide type and tetramethylthiuramdisulfide The prepared rubber compositions (Samples) were cured at a temperature of about 160° C. for about 14 minutes and the various physical properties (rounded numbers are reported herein) as reported in the following Table 5.

TABLE 5

| Properties | Control Sample 1 SBR, BR, 3,4-PI | Sample 2 SIR/BR | Sample 3 SBR/BR |
|---|---|---|---|
| Stress/strain | | | |
| 300% modulus (MPa) | 10.2 | 9.4 | 8.7 |
| Tensile strength (MPa) | 18.5 | 16.1 | 13.7 |
| Ultimate elongation (%) | 485 | 473 | 430 |
| Hardness, Shore A | | | |
| 23° C. | 63 | 66.4 | 64.4 |
| 100° C. | 57.4 | 60.9 | 60 |
| Rebound | | | |
| 23° C. | 46.8 | 31.3 | 56.3 |
| 100° C. | 66.1 | 64.5 | 64.3 |
| DIN abrasion, Rel. Vol. Loss (cm$^3$) | 146 | 56 | 57 |
| Tan Delta (11 Hz) | | | |
| 0° C. | 0.2 | 0.4 | 0.12 |
| 100° C. | 0.085 | 0.090 | 0.092 |
| Brittle point (ASTM D746)[1] | −61° C. | −64° C. | <−64° C. |

[1]For Sample 3, the Brittle Point was lower than −64° C., the limit of the Brittle Point Test.

From Table 5 it is seen that Sample 2 (SIR/Branched BR blend) has excellent modulus, tensile and elongation at break properties and superior hardness values as compared to Sample 3 (SBR/Branched BR blend) and the control Sample 1. This is considered herein as being significant for tire durability and tire handling for a tire having a tread of such rubber composition.

From Table 5 it is also seen that Sample 2 (SIR/Branched BR blend) has superior hysteretic properties such rebound and tan delta values.

From Table 5 it is seen that Sample 2 has the lowest rebound value at 23° C. and highest tan delta value at 0° C. This is indicative of superior of wet traction for a tire having a tread of such rubber composition.

It can also be seen that Sample 2 has excellent abrasion resistance (treadwear) and low brittle point. The low brittle point aspect was an unexpected result. Perhaps this is because the SIR elastomer is maintained in the rubber composition as a minor component as compared to the Branched BR because the high styrene-containing SIR would otherwise normally be expected to disadvantageously raise the brittle point of the rubber composition.

An analytical plot of a tangent delta (tan delta) curve versus temperature for a tire tread rubber composition is considered herein to be informative. In particular, such tan delta versus temperature plot for a tire tread rubber composition desirably presents a maximum tan delta value in the region of −20° C. to +20° C. temperature (between vertical lines "a" and "b" of FIG. 1), which is predictive of good wet traction for a tread of such rubber composition and a minimum tan delta value in the region of 60° C., which is predictive of good rolling resistance for a tread of such rubber composition.

It can be seen that the Rebound and tan delta values at 100° C. for Sample 2 and Sample 3 are similar which is indicative of low rolling resistance for a tire having a tread of such rubber compositions. Thus it is predictive that improved traction of such tread would be obtained for a tread of Sample 2 while maintaining the rolling resistance of the Sample 3.

Using the physical properties reported in Table 5 of this Example, and in order to further illustrate the rubber composition of this invention, FIG. 1 is presented as a plot of tan delta versus temperature for Samples 2 and 3, where Sample 2 is the blend of said SIR and said Branched BR and Sample 3 is a blend of SBR and said Branched BR. The SIR had a styrene content of about 45 percent and a styrene sequence of at least 90 percent units being present in 5 or less sequential units and not more than about 10 percent units being present in more than 5 sequential units.

By inspection of FIG. 1, it can be seen that Sample 2 presents two distinct transitions, namely a transition in the region of about −95° C. and a transition in the region of about 0° C. thus indicating an immiscible rubber blend. Sample 3, however, presents only one transition in the region of about −60° C. thereby indicating a miscible rubber blend.

Inspection of the graph, or plot, of FIG. 1 shows a maximization for Sample 2, the immiscible blend, of the tan delta curve in the region of about 0° C. and a minimization of the tan delta curve in the region of about 60° C. This is considered significant herein because where both of such properties are optimized as indicated by such tan delta curve, namely, both the maximization in the 0° C. region combined with a minimization in the 60° C. region, it is considered herein that it is predictive that, for a tire with such tread composition, both wet traction, as predicted by higher tan delta at 0° C., and rolling resistance, as predicted by lower tan delta at 60° C., are improved.

Figure 2:
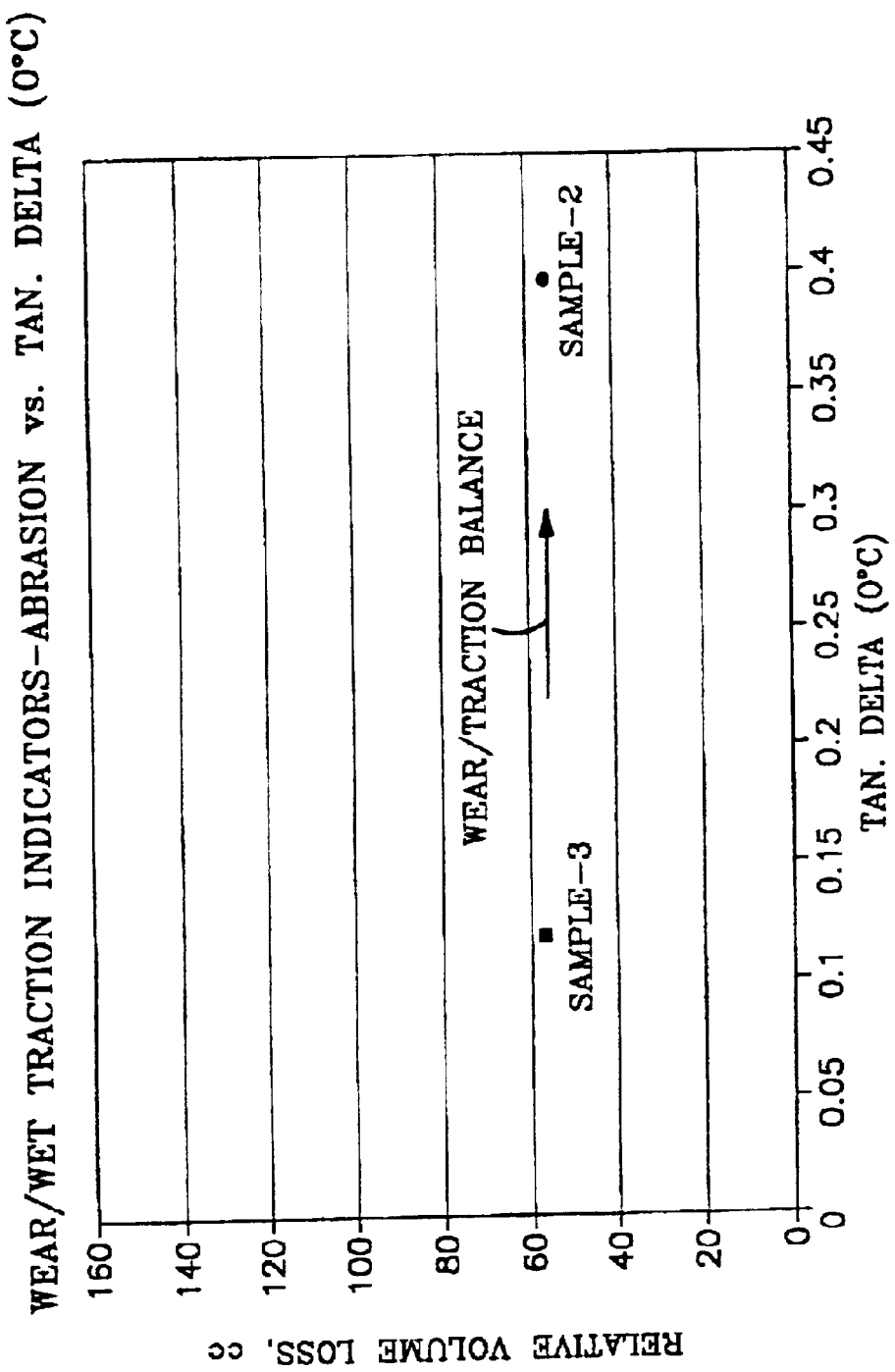

FIG. 2 is presented as a plot of DIN abrasion versus tan delta (0° C.) for Sample 2 (the SIR/Branched BR blend) and Sample 3. In FIG. 2 it is seen that for similar DIN abrasion values (treadwear), Sample 2 exhibits a significantly higher (4×) tan delta (0° C.) value than such value for Sample 3.

This is considered herein to be significant because it illustrates that the rubber composition of Sample 2 has a substantially greater predictive wet traction (for a tire tread) without sacrificing treadwear which is an unexpected result and is considered herein to be a significant discovery.

Indeed, inspection, of FIG. 2 shows this novel immiscible blend of elastomers provides a significant improvement in wet traction and tread wear as compared to current SBR/BR technology.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a tread of a rubber composition comprised of, based on parts by weight per 100 parts by weight of the tread rubber elastomers (phr),
   (A) elastomers comprised of
      (1) about 5 to about 45 phr of styrene/isoprene copolymer elastomer (SIR) having a styrene content in a range of from 30 to about 55 percent, a single Tg within in a range of about 0° C. to about −40° C. and wherein the isoprene component of said SIR has a microstructure comprised of a maximum 3,4-polyisoprene content of 11 percent, and
      wherein the styrene distribution in said SIR is characterized in that,
         (a) the minimum percent of the styrene units present in not more than five sequential styrene units (St$_5$) is about the sum of 125.6 minus 0.92 times the percent by weight of styrene units in the SIR, and
         (b) the maximum percent of styrene units present in more than five sequential styrene units is equal to 100 less the said minimum St$_5$ unit percent, and (2) about 55 to about 95 phr of cis 1,4-polybutadiene rubber (BR) having a cis 1,4-content of at least 95 percent and a single Tg within in a range of from about −100° C. to about −107° C., wherein the weight ratio of said BR to said SIR is at least 1.1/1, wherein the Tg of said BR is at least 60° C. lower than the Tg of said SIR, (B) about 40 to about 110 phr of reinforcing filler comprised of at least one of carbon black, aggregates of precipitated silica and silica-containing carbon black which contains silica domains on its surface; and (C) a coupling agent, when said reinforcing filler is precipitated silica and/or said silica-containing carbon black, having a moiety reactive with hydroxyl groups contained on the surface of said aggregates of precipitated silica and hydroxyl groups contained on the surface of the silica domains of said silica-containing carbon black;

wherein said BR is a branched BR having a Mooney, (ML 1+4) at 100° C., viscosity value in its unvulcanized state in a range of about 35 to about 45.

2. The tire of claim 1 wherein said BR is a cis 1,4-polybutadiene elastomer having a cis 1,4-content in a range of about 96 to about 98 percent, and prepared by polymerizing 1,3-butadiene in the presence of organonickel compound as a nickel salt of a carboxylic acid, organoaluminum compound as a trialkylaluminum compound, hydrogen fluoride and para-styrenated diphenylamine, wherein said organoaluminum compound and said fluorine containing compound are brought together in the presence of said para-styrenated diphenylamine.

3. The tire of claim 1 wherein said SIR is prepared by reacting styrene and isoprene monomers in an organic solvent with an anionic polymerization catalyst comprised of n-butyllithium and sodium sulfonate or sodium alkoxide.

4. The tire of claim 1 wherein said SIR is prepared by reacting styrene and isoprene monomers in an organic solvent with a catalyst comprised of n-butyllithium and sodium dodecylbenzene sulfonate.

5. The tire of claim 1 wherein the weight ratio of said BR to said SIR is within a range of about 60/40 to about 80/20.

6. The tire of claim 1 wherein said rubber composition also contains from about 5 to about 20 phr of at least one additional elastomer selected from polymers of isoprene and/or 1,3-butadiene and copolymers of styrene with 1,3-butadiene and copolymers of styrene, isoprene and 1,3-butadiene.

7. The tire of claim 1 wherein said rubber composition is exclusive of polymers of isobutylene.

8. The tire of claim 1 wherein said reinforcing filler is carbon black.

9. The tire of claim 1 wherein said reinforcing filler is precipitated silica and said coupling agent is a bis-(3-trialkylsilylalkyl)polysulfide having an average of from 2 to 2.6 or from 3.5 to 4 connecting sulfur atoms in its polysulfidic bridge.

10. The tire of claim 1 wherein said reinforcing filler is carbon black and precipitated silica and where said coupling agent is a bis-(3-trialkylsilylalkyl)polysulfide having an average of from 2 to 2.6 or from 3.5 to 4 connecting sulfur atoms in its polysulfidic bridge.

11. The tire of claim 9 wherein said coupling agent is a bis-(3-triethoxysilylpropyl)polysulfide.

12. The tire of claim 1 wherein said rubber composition exhibits two tan. delta transition points as a first tan. delta transition point in a region of about 95° C. and a second transition point in a region of about 0° C.

13. A pneumatic rubber tire having a tire tread of a rubber composition comprised of, based on parts by weight per 100 parts by weight of the tread rubber elastomers (phr), (A) elastomers comprised of
(1) about 10 to about 40, phr of styrene/isoprene copolymer elastomer (SIR) having a styrene content in a range of from 30 to about 55 percent, a single Tg within in a range of about −5° C. to about −30° C., and wherein the isoprene component of said SIR has a microstructure comprised of a maximum 3,4-polyisoprene content of 11 percent, and wherein the styrene distribution in said SIR is characterized in that,
(a) the minimum percent of the styrene units present in not more than five sequential styrene units ($St_5$) is equal to about the sum of 29 plus 1.53 times the percent by weight of styrene units in the SIR, and
(b) the maximum percent of styrene units present in more than five sequential styrene units is equal to 100 less the said minimum $St_5$ unit percent, and (2) about 60 to about 90 phr of cis 1,4-polybutadiene rubber (BR) having a cis 1,4-content of at least 95 percent and a single Tg within in a range of from about −100° C. to about −107° C., wherein the weight ratio of said BR to said SIR is in a range of from about 60/40 to about 80/20, wherein the Tg of said BR is at least 85° C. lower than the Tg of said SIR, (B) about 40 to about 110 phr of reinforcing filler comprised of at least one of carbon black and aggregates of precipitated silica;

(C) a coupling agent, when said reinforcing filler includes precipitated silica, having a moiety reactive with hydroxyl groups contained on the surface of said aggregates of precipitated silica;

wherein said BR is a branched BR having a Mooney, (ML 1+4) at 100° C., viscosity value in its unvulcanized state in a range of about 35 to about 45.

14. The tire of claim 13, wherein said SIR is prepared by reacting styrene and isoprene monomers in an organic solvent with a catalyst comprised of butyl lithium and sodium docecylbenzene sulfonate.

15. The tire of claim 13, wherein said rubber composition also contains from about 5 to about 20 phr of at least one additional elastomer selected from polymers of isoprene andlor 1,3-butadiene and copolymers of styrene with 1,3-butadiene and copolymers of styrene, isoprene and 1,3-butadiene.

16. The tire of claim 13 wherein said rubber composition is exclusive of polymers of isobutylene.

* * * * *